United States Patent
Suzuki et al.

(10) Patent No.: US 8,081,789 B2
(45) Date of Patent: Dec. 20, 2011

(54) MICROPHONE HOLDER AND MICROPHONE DEVICE USING SAME

(75) Inventors: Yoshiho Suzuki, Kyoto (JP); Hitoshi Miyamoto, Osaka (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 783 days.

(21) Appl. No.: 12/200,149

(22) Filed: Aug. 28, 2008

(65) Prior Publication Data

US 2009/0060247 A1   Mar. 5, 2009

(30) Foreign Application Priority Data

Aug. 31, 2007 (JP) ................................. 2007-225133

(51) Int. Cl.
  H04M 1/00    (2006.01)
  H04M 9/00    (2006.01)
  H04R 11/04   (2006.01)
  H04R 9/08    (2006.01)
  H04R 17/02   (2006.01)
  H04R 19/04   (2006.01)
  H04R 21/02   (2006.01)

(52) U.S. Cl. ........ 381/364; 381/122; 381/361; 381/375; 379/430; 455/569.1

(58) Field of Classification Search .............. 379/430; 381/122, 361, 364, 375; 455/569.1
See application file for complete search history.

(56) References Cited

U.S. PATENT DOCUMENTS

| 3,692,958 | A | * | 9/1972 | Dymoke | 379/430 |
| 5,845,197 | A | * | 12/1998 | Hada et al. | 455/569.1 |
| 6,316,706 | B1 | * | 11/2001 | Sammons | 84/327 |
| 6,438,248 | B1 | * | 8/2002 | Kamimura et al. | 381/374 |
| 7,979,035 | B2 | * | 7/2011 | Griffin et al. | 455/90.3 |
| 2003/0123689 | A1 | * | 7/2003 | Uchimura et al. | 381/364 |
| 2006/0166705 | A1 | * | 7/2006 | Seshadri et al. | 455/569.1 |
| 2008/0132293 | A1 | * | 6/2008 | Gundlach et al. | 455/569.1 |
| 2010/0254563 | A1 | * | 10/2010 | Harper | 381/375 |

FOREIGN PATENT DOCUMENTS

JP    2007-142601 A    6/2007

* cited by examiner

*Primary Examiner* — Victor A Mandala
(74) *Attorney, Agent, or Firm* — Westerman, Hattori, Daniels & Adrian, LLP

(57) ABSTRACT

A microphone device according to the present invention comprises a plurality of microphones and a microphone holder for holding the microphones. The microphones include a first sound receiving part and a second sound receiving part. The microphone holder comprises a holder body, and the holder body includes a plurality of microphone engaging recesses facing in different directions from each other and to be removably in engagement with the plurality of microphones. These microphone engaging recesses are to be in engagement with the plurality of microphones with the first sound receiving part facing the outer side of the holder body.

9 Claims, 5 Drawing Sheets

MICROPHONE HOLDER AND MICROPHONE DEVICE USING SAME

The priority application Number 2007-225133, upon which this patent application is based, is hereby incorporated by reference.

BACKGROUND OF THE INVENTION

1. Field of the Invention

The present invention relates to microphone devices capable of recording a plurality of channels comprising a plurality of microphones wearable on users' ears.

2. Description of Related Art

There has been conventionally known a microphone device with two microphones that is capable of recording the voice of the person on the phone with one microphone while recording the user's voice with the other microphone, with the user wearing the one microphone on an ear while having the other microphone fixed close to the mouth, and speaking on the phone while pressing the telephone receiver against the ear on which the one microphone is worn. According to this microphone device, it is possible to record the phone call regardless of the type and shape of the telephone.

However, the purpose of the microphone device described above is limited to recording a phone call with a telephone, and it is difficult to use the device for the purpose of stereo recording using the two microphones as a microphone for a left channel and a microphone for a right channel.

Also, a binaural recording system has been attracting a lot of attention as a recording system for obtaining a high sense of reality. However, it is difficult to apply the conventional microphone device described above to such a binaural recording system.

SUMMARY OF THE INVENTION

An object of the present invention is to provide a microphone device capable of realizing three types of recording system: recording a phone call with a telephone, recording a plurality of channels such as a stereo recording, and a binaural recording, and a microphone holder suitable for the structure of the microphone device.

A microphone device according to the present invention comprises a plurality of microphones 2 for recording a plurality of channels and a microphone holder 1 for holding these microphones 2. A casing 22 of the microphone 2 includes a first sound receiving part and a second sound receiving part, both of which can receive sound, and sound can pass from the second sound receiving part to the first sound receiving part.

A holder body 15 of the microphone holder 1 is provided with a plurality of microphone engaging recesses 10 which are to be removably in engagement with the plurality of microphones 2 respectively. The microphone engaging recesses 10 face in different directions from each other. The plurality of microphones 2 are to be in engagement with these recesses 10 with the second sound receiving part facing the outer side of the holder body 15 and the first sound receiving part facing the inner side of the holder body 15.

It is possible to provide a clipper to the microphone 2 for clipping the holder body 15 on a user's body.

With the microphone device of the present invention described above, in the case of recording a plurality of channels, the plurality of microphones 2 are fixed in the microphone holder 1 and the microphone holder 1 is clipped on the user's body, and then cords 20 extending from the plurality of microphones 2 are connected to a recording device for a plurality of channels such as an IC recorder.

When the plurality of microphones 2 are held in the microphone holder 1, the first sound receiving parts of the microphones 2 face the outer side of the holder body 15 and in different directions from each other. Therefore, they receive sounds from a plurality of directions, thereby realizing the recording of a plurality of channels.

In the case of recording a phone call, one of the microphones 2 is removed from the microphone holder 1 to be worn on a user's ear. The microphone holder 1, which keeps the other of the microphones 2 therein, is clipped on the user's body. And then, the cords 20 extending from the plurality of microphones 2 are connected to a recording device for a plurality of channels such as an IC recorder. Then the user conducts a phone call, pressing a telephone receiver on the ear wearing the one of the microphones 2.

The second sound receiving part of the microphone 2 worn on the ear faces the outer side of the ear, while the first sound receiving part faces the inner side of the ear. Therefore, the voice on the other end of the line which comes from the telephone receiver is received by the second sound receiving part to be recorded by the microphone 2 worn on the ear, while the user's own voice is recorded by the other microphone 2 clipped on the user's body. Here, since the voice on the other end of the line is transmitted from the second sound receiving part of the microphone 2 through the first sound receiving part to the inside of the user's ear, the user can clearly hear the voice on the other end of the line.

In the case of conducting the binaural recording, the two microphones 2, 2 are removed from the microphone holder 1 to be worn on the user's both ears. And then the cords 20, 20 extending from both of the microphones 2, 2 are connected to a recording device for a plurality of channels such as an IC recorder.

The second sound receiving parts of the microphones 2, 2 worn on the user's both ears face the outer side of the ears, and therefore, the ambient sound directed to the user is received by the second sound receiving parts to be recorded by the microphones 2, 2.

In a particular configuration, the holder body 15 of the microphone holder 1 has a dividing wall 13 which divides the plurality of microphone engaging recesses 10. According to this particular configuration, in the case of recording a plurality of channels, even when the sounds of the plurality of channels to be recorded by the plurality of microphones 2 pass through from the first sound receiving part to the second sound receiving part, these sounds are blocked by the dividing wall 13 and will not be mixed with each other.

In another particular configuration, the plurality of microphone engaging recesses 10 of the holder body 15 of the microphone holder 1 are symmetrical with respect to a point on a plane which intersects with the holder body 15. According to this particular configuration, in recording a plurality of channels, the plurality of microphones 2 are kept in the positions symmetrical to each other with respect to a point, and therefore receive ambient sounds evenly, thereby realizing a well balanced recording of a plurality of channels.

In a further particular configuration, the holder body 15 of the microphone holder 1 is provided with a retaining member for retaining a base end part of the cord 20 extending from the microphone 2 in engagement with the microphone engaging recess 10. According to this particular configuration, when the microphone 2 is in engagement with the microphone engaging recess 10, the base end part of the cord 20 extending from the microphone 2 is retained by the retaining member at the same time, thereby ensuring the retainment of the microphone 2 by the microphone holder 1.

As described above, according to the microphone holder and the microphone device using the same of the present invention, it is possible to realize three types of recording system, which are the recording of a phone call, the recording of a plurality of channels such as stereo recording, and the binaural recording, more easily than conventionally.

DETAILED DESCRIPTION OF THE INVENTION

An embodiment of the present invention is specifically described below with reference to the drawings.

Figure 1:
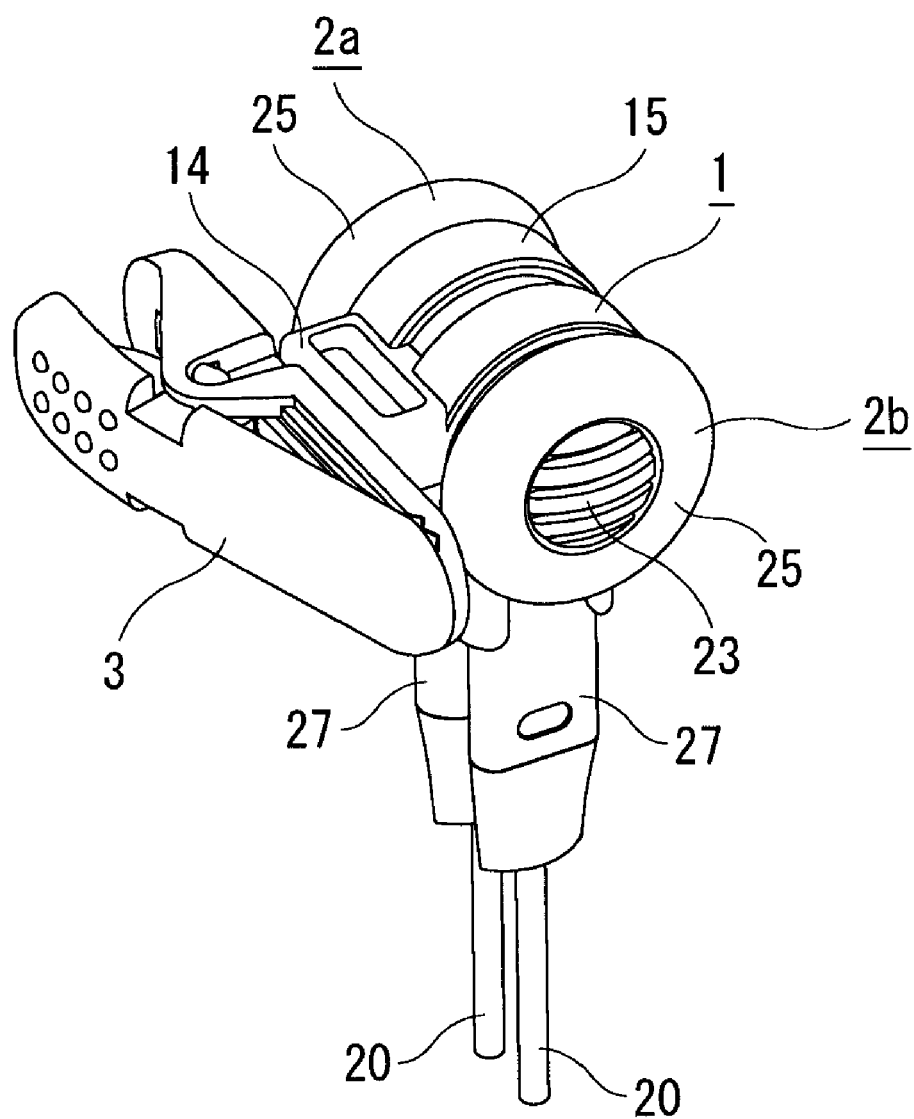
FIG. 1 is a perspective view of a microphone device according to the present invention.

As shown in FIG. 1, a microphone device according to the present invention comprises two microphones 2a, 2b for recording two channels and a microphone holder 1 for holding the microphones 2a, 2b. The microphone holder 1 includes a holder body 15 made of a comparatively flexible synthetic resin such as elastomer resin and a clip 3 attached thereto, and it is possible to clip the microphone holder 1 on a user's clothes by means of the clip 3.

Figure 2:
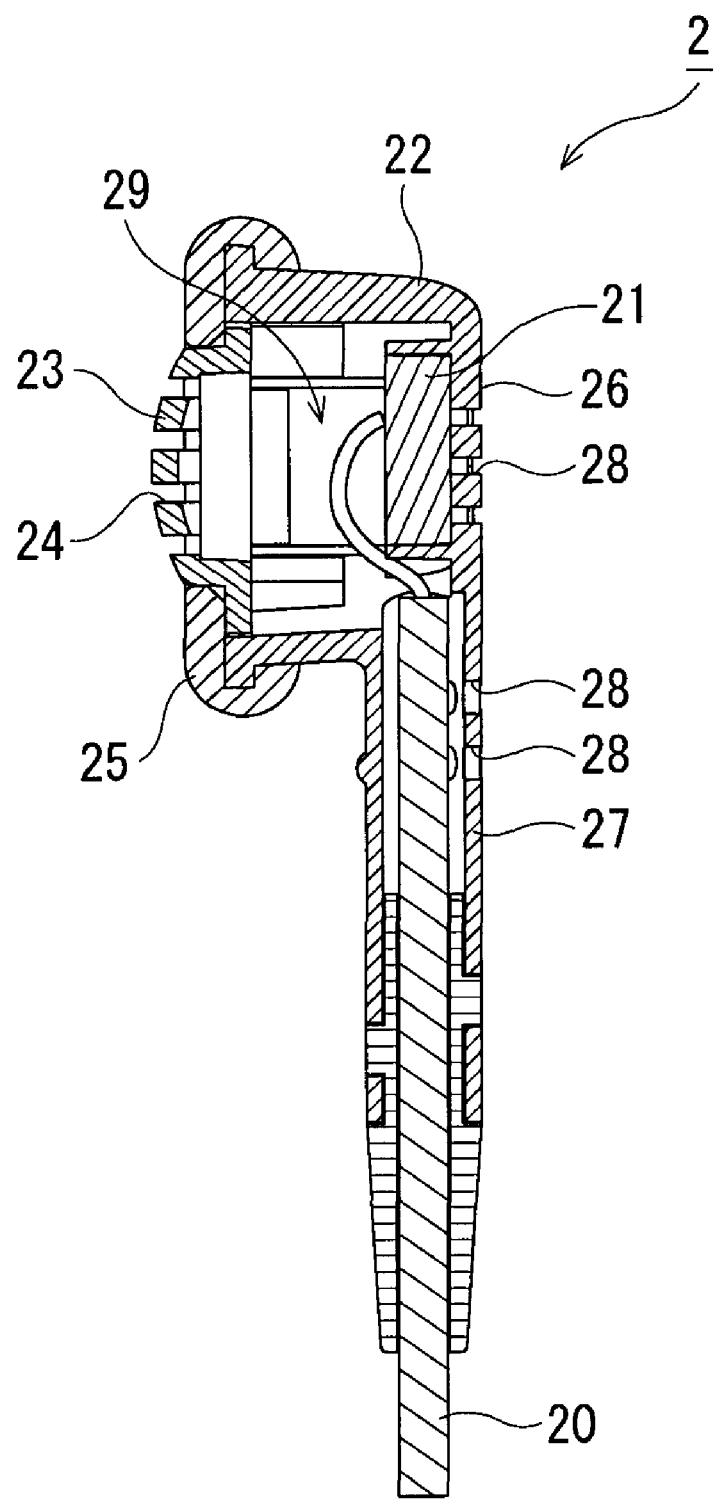
FIG. 2 is a cross section view of a microphone.

As shown in FIG. 2, the microphone 2 includes a casing 22 with its front face covered by a front face cover 23 and a sound-electricity converter 21 stored in a space 29 within the casing 22. The casing 22 has a cylindrical wall part 27 which projects downward therefrom, and a cord 20 which extends from the sound-electricity converter 21 and passes through the cylindrical wall part 27. Also, the casing 22 includes an ear pad 25 covering an outer periphery of the front face cover 23.

The front face cover 23 has a plurality of front face through-holes 24 to define a first sound receiving part, while a rear face wall part 26 and the cylindrical wall part 27 of the casing 22 have a plurality of rear face through-holes 28 opening in the opposite direction to the front face through-holes 24 to define a second sound receiving part. The front face thorough-holes 24 and the rear face thorough-holes 28 are in communication with the space 29, and it is possible that sound passes from the rear face through-holes 28 through the space 29 to the front face through-holes 24.

Sound which comes from the front side of the microphone 2 passes through the front face through-holes 24 of the front face cover 23, and then is converted into electrical signals by the sound-electricity converter 21. Also, sound which comes from the rear side of the microphone 2 passes through the rear face through-holes 28 of the rear face wall part 26, and then is converted into electrical signals by the sound-electricity converter 21.

The microphone 2 is wearable on the ear by being inserted in the entrance of the auditory meatus on the side of the front face cover 23. In a state where the microphone 2 is worn in this manner, the front face through-holes 24 are in communication with the back portion of the auditory meatus, and the rear face through-holes 28 are in communication with the outer space.

Figure 3:
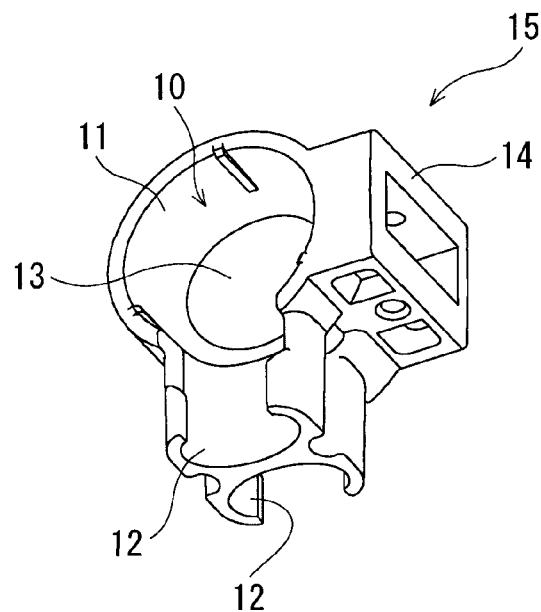
FIG. 3 is a perspective view of a holder body of a microphone holder.
Figure 4:
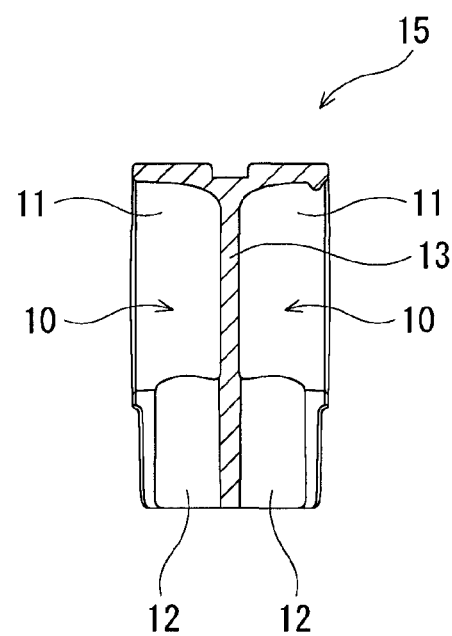
FIG. 4 is a cross section view of the holder body.

As shown in FIGS. 3 and 4, the holder body 15 of the microphone holder 1 includes a dividing wall 13 disposed in the center, a pair of first tubular wall parts 11, 11 projecting in the opposite directions and on the right side and the left side of the dividing wall 13, a pair of second tubular wall parts 12, 12 projecting downward from the respective first tubular wall parts 11, 11, and a projecting part 14 provided on a side of the first tubular wall parts 11, 11. A pair of oppositely facing microphone engaging recesses 10 10 is defined by the first tubular wall parts 11, 11 and the dividing wall 13.

Figure 5:
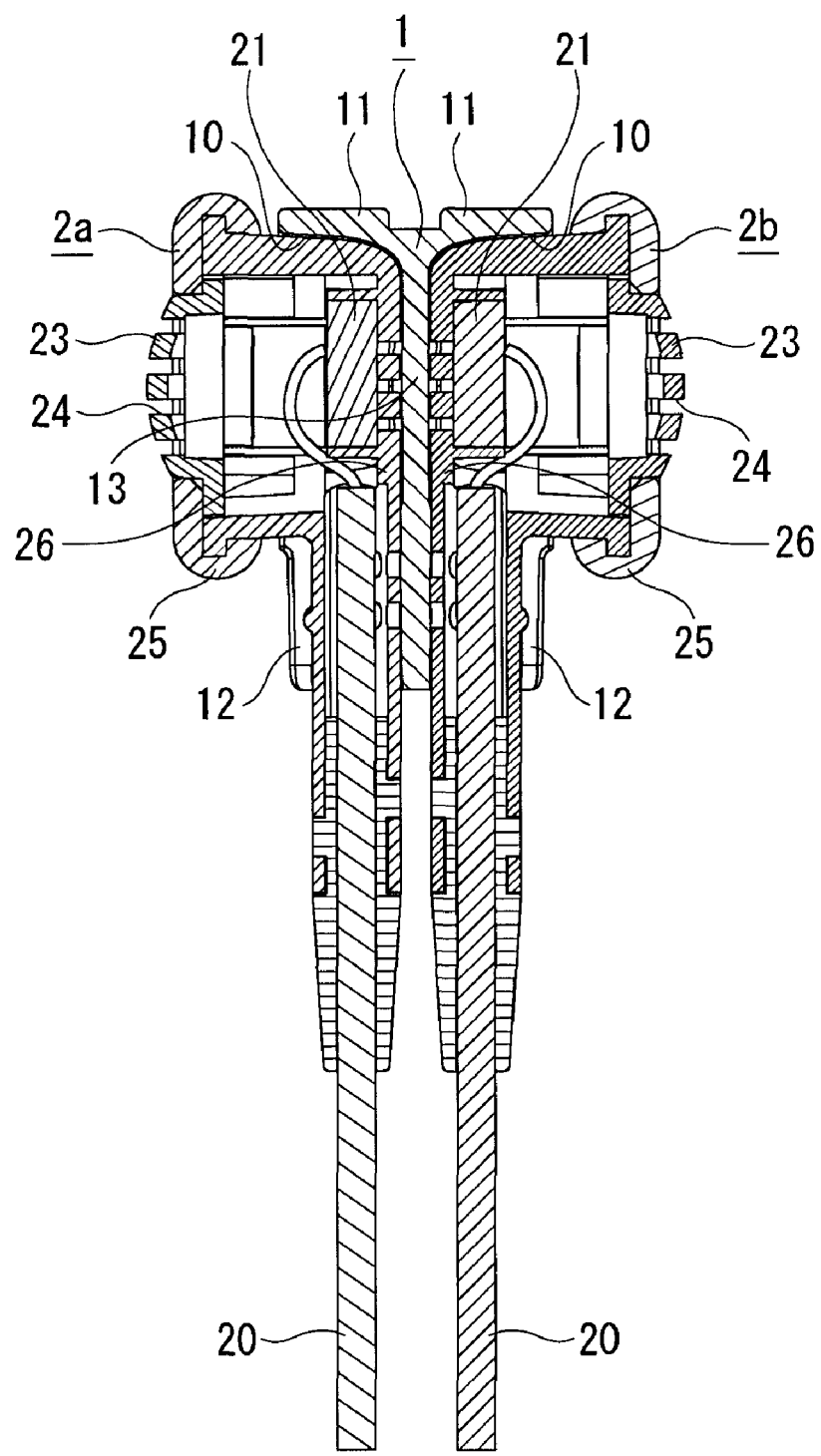
FIG. 5 is a cross section view of the microphone holder with two microphones held therein.

As shown in FIG. 5, the pair of microphones 2a, 2b can be removably in engagement with the pair of microphone engaging recesses 10 10 of the microphone holder 1 by being inserted thereto from the side of the rear face wall part 26, while the base end parts of the cords 20, 20 extending from the microphones 2a, 2b can be removably in engagement with the second tubular wall parts 12, 12 of the microphone holder 1. In a state where the microphones 2a, 2b are in engagement with the pair of microphone engaging recesses 10 10 of the microphone holder 1, each of the front face through-holes 24 of the microphones 2a, 2b opens outward on the both sides of the microphone holder 1, and sound which comes from the both sides is converted into electrical signals by the sound-electricity converters 21 21.

In the case of recording a phone call of a telephone with the microphone device according to the present invention described above, as shown in FIG. 6(*a*), one of the microphones 2a is removed from the microphone holder 1 and worn on a user's ear. The other of the microphones 2b is held in the microphone holder 1, which is clipped on the user's clothes by means of the clip 3. And then, the cords 20, 20 extending from the microphones 2a, 2b are connected to a stereo recording device such as an IC recorder (not shown). Then the user conducts a phone call, pressing a telephone receiver of a telephone 4 on the ear wearing the microphone 2a.

Here, in the microphone 2a worn on the ear, the rear face through-holes 28 face the outer side of the ear, and the front face through-holes 24 face the inner side of the ear. Therefore, the voice on the other end of the line which comes from the telephone receiver of the telephone 4 passes through the rear face through-holes 28, and reaches the sound-electricity converter 21 to be recorded by the microphone 2a. At the same time, the user's own voice is recorded by the microphone 2b clipped on the user's clothes by means of the clip 3. In addition, the voice on the other end of the line which comes from the telephone receiver of the telephone 4 passes through the rear face through-holes 28, the space 29, and the front face through-holes 24 of the microphone 2a, and then reaches the user's ear, and therefore the user can clearly hear the voice on the other end of the line.

Figure 6A:
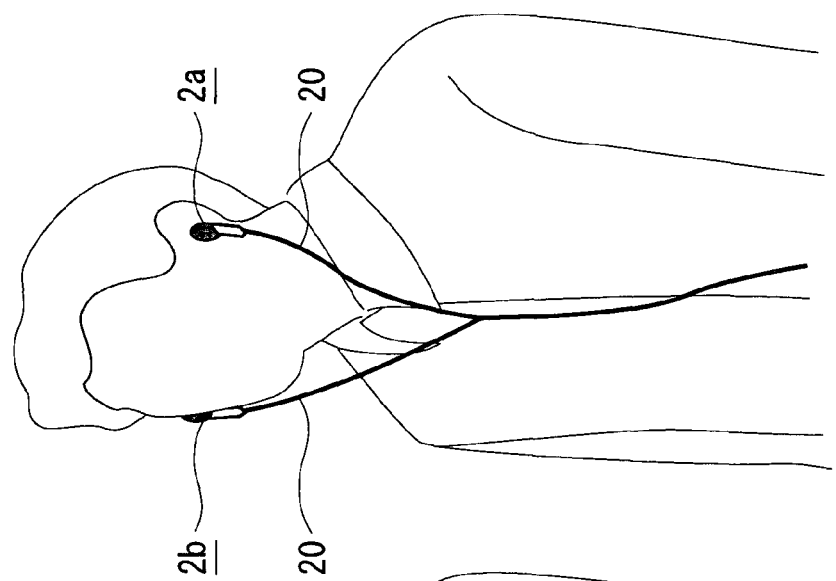
FIGS. 6(*a*), (*b*), and (*c*) illustrate three types of recording system.
Figure 6B:
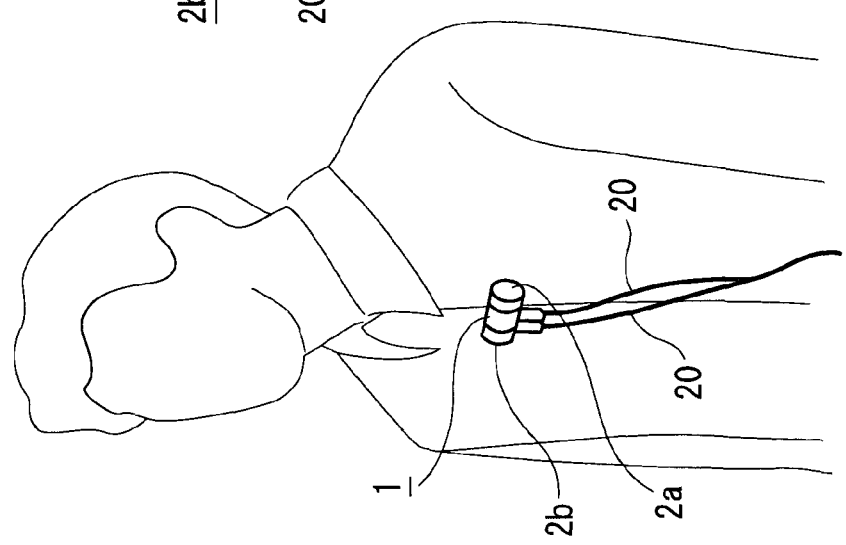

In the case of conducting the stereo recording, as shown in FIG. 6(*b*), both of the microphones 2a, 2b are held in the microphone holder 1, which is clipped on the user's clothes. And then, the cords 20, 20 extending from the microphones 2a, 2b are connected to a stereo recording device such as an IC recorder (not shown).

In a state where the microphones 2a, 2b are held in the microphone holder 1, the front face through-holes 24 of the microphones 2a, 2b open toward the outer side of the holder body 15 and face in opposite directions to each other, and therefore receive sounds which come from both sides of the user.

Here, since the dividing wall 13 of the microphone holder 1 provides a sound insulation between the microphones 2a, 2b held in the microphone holder 1, the sounds from both sides will not be mixed with each other when recorded. Accordingly, it is possible to conduct the stereo recording with both of the microphones 2a, 2b.

Figure 6C:
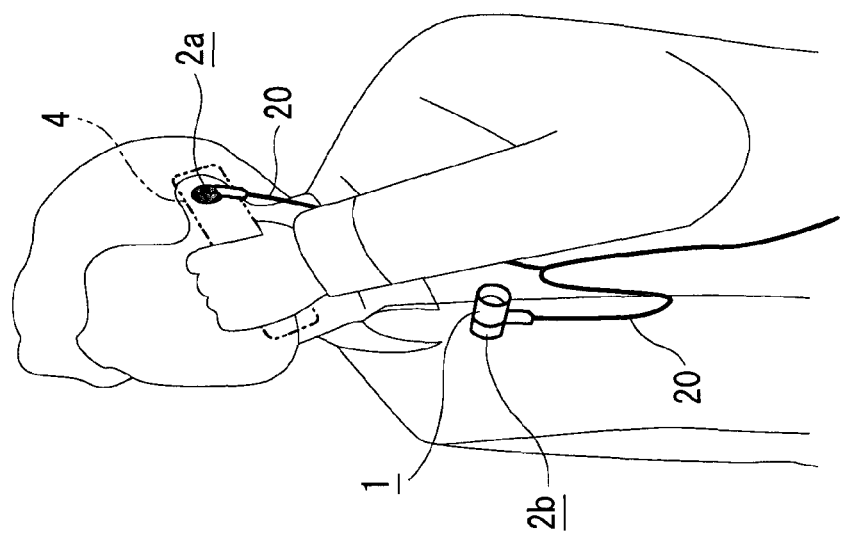

In the case of conducting the binaural recording, as shown in FIG. 6(c), the two microphones 2a, 2b are removed from the microphone holder 1 and are worn on both ears. And then, the cords 20, 20 extending from the microphones 2a, 2b are connected to a stereo recording device such as an IC recorder (not shown).

Since the rear face through-holes 28 28 of the microphones 2a, 2b worn on both ears face the outer side of the ears, the ambient sounds which come to the user pass through the rear face through-holes 28 28 of the microphones 2, 2 and reach the sound-electricity converters 21 21. The binaural recording is conducted in such a manner.

As described, with the microphone device according to the present invention, it is possible to easily conduct the three types of recording system of a phone call recording with a telephone, a stereo recording, and a binaural recording.

The present invention is not limited to the foregoing embodiment in construction but can be modified variously by one skilled in the art without departing from the spirit of the invention as set forth in the appended claims. For example, the clip 3 can be replaced with a safety pin to clip the microphone holder 1 on the user's clothes, or a neck strap can be attached to the microphone holder 1 so that the microphone device can be dangled around the user's neck.

Also, the number of microphones 2 to be held in the microphone holder 1 is not limited to two, and it is possible to adopt a structure in which three or more microphones 2 are removably in engagement with the microphone holder 1, thereby enabling the recording of multiple channels.

Additionally, in the embodiment described above, the first sound receiving part faces outward and the second sound receiving part faces inward when the microphone 2 is held in the microphone holder 1. However, it is also possible to adopt a structure in which the first sound receiving part faces inward and the second sound receiving part faces outward, thereby allowing the user to fix the microphone 2 to the microphone holder 1 without minding the direction in which the microphone 2 faces.

Further additionally, the microphone 2 itself can be provided with a holder function and a plurality of microphones 2 can be directly connected to each other.

What is claimed is:

1. A microphone holder for holding a plurality of microphones each having a first sound receiving part and a second sound receiving part, the microphone holder comprising a holder body having a plurality of microphone engaging recesses defined in different directions for removably engaging the plurality of microphones respectively, the microphone engaging recesses being configured to engage the plurality of microphones with the first sound receiving part of each of the microphones facing the outer side of the holder body, and the second sound receiving part of each of the microphones facing the inner side of the holder body.

2. The microphone holder according to claim 1, further comprising a clipper for clipping the holder body on a user's body.

3. The microphone holder according to claim 1, wherein the holder body comprises a dividing wall for dividing the plurality of microphone engaging recesses.

4. The microphone holder according to claim 1, wherein the plurality of microphone engaging recesses of the holder body are symmetrical with respect to a point on a plane which intersects with the holder body.

5. The microphone holder according to claim 1, wherein the holder body comprises a retaining member for retaining a base end part of a cord extending from each of the microphones in engagement with the microphone engaging recesses.

6. The microphone holder according to claim 1, wherein the holder body is made of a resin with elasticity.

7. A microphone device comprising a plurality of microphones for recording a plurality of channels and a microphone holder for holding the plurality of microphones, wherein the microphones each include a first sound receiving part and a second sound receiving part, and sound can pass from the second sound receiving part to the first sound receiving part, wherein the microphone holder has a holder body including a plurality of microphone engaging recesses defined in different directions for removably engaging the plurality of microphones respectively, the microphone engaging recesses being configured to engage the plurality of microphones with the first sound receiving part of each of the microphones facing the outer side of the holder body, and the second sound receiving part of each of the microphones facing the inner side of the holder body.

8. The microphone device according to claim 7, wherein in a state where each of the microphones is worn on a user's ear, the first sound receiving part faces the inner side of the ear, and the second sound receiving part faces the outer side of the ear.

9. The microphone device according to claim 7, wherein the microphone holder comprises a clipper for clipping the holder body on a user's body.

* * * * *